(12) United States Patent
Randrianarivony et al.

(10) Patent No.: US 8,894,326 B2
(45) Date of Patent: Nov. 25, 2014

(54) VERTICAL OFFSHORE FLEXIBLE PIPELINE ASSEMBLY

(75) Inventors: Liva Christian Randrianarivony, Eze bord de Mer (FR); Florian Couget, Nice (FR); Pieter Liem, Monte Carlo (MC); Eric Sebellin, Nice (FR)

(73) Assignee: Single Buoy Moorings Inc., Marly (CH)

( * ) Notice: Subject to any disclaimer, the term of this patent is extended or adjusted under 35 U.S.C. 154(b) by 95 days.

(21) Appl. No.: 13/498,177

(22) PCT Filed: Sep. 24, 2010

(86) PCT No.: PCT/EP2010/064110
§ 371 (c)(1),
(2), (4) Date: Mar. 26, 2012

(87) PCT Pub. No.: WO2011/036237
PCT Pub. Date: Mar. 31, 2011

(65) Prior Publication Data
US 2012/0183357 A1 Jul. 19, 2012

(30) Foreign Application Priority Data
Sep. 24, 2009 (EP) ..................................... 09171199

(51) Int. Cl.
*F16L 1/225* (2006.01)
*F16L 1/19* (2006.01)
*F16L 1/20* (2006.01)

(52) U.S. Cl.
CPC . *F16L 1/225* (2013.01); *F16L 1/19* (2013.01); *F16L 1/207* (2013.01)
USPC ......................................... 405/166; 405/168.1

(58) Field of Classification Search
USPC .............. 405/158, 166, 167, 169, 170, 168.1, 405/168.2, 168.3
See application file for complete search history.

(56) References Cited

U.S. PATENT DOCUMENTS

| 3,440,826 A | 4/1969 | Kline |
| 4,899,682 A * | 2/1990 | Pouget et al. ................. 114/264 |

(Continued)

FOREIGN PATENT DOCUMENTS

| EP | 0 020 257 | 12/1980 |
| EP | 0 054 332 | 6/1982 |

(Continued)

OTHER PUBLICATIONS

International Search Report dated Dec. 7, 2010, corresponding to PCT/EP2010/064110.

*Primary Examiner* — Benjamin Fiorello
*Assistant Examiner* — Kyle Armstrong
(74) *Attorney, Agent, or Firm* — Young & Thompson

(57) ABSTRACT

Offshore deployment device for an installation vessel (4) with a deck (5) to deploy a hydrocarbon transfer pipe (2) composed of several pipe segments (3), the device including a trolley hoist lifting element (10), installed in a tower (6) to lift a pipe segment from an horizontal position into a vertical position, an assembly platform (8), where a segment is connected to a previously launched transfer pipe string, the assembly platform being provided with a clamping device that is supported on the installation vessel and adapted to support the weight of the previously launched pipe string during assembling, wherein the hydrocarbon transfer pipe is a flexible hose string composed of several flexible hose segments, the flexible hose string being guided from a vertical position into an inclined or a horizontal position via a hose string guide element (15) which is placed under the assembly platform.

18 Claims, 7 Drawing Sheets

(56) References Cited

U.S. PATENT DOCUMENTS

| | | | |
|---|---|---|---|
| 5,183,122 A * | 2/1993 | Rowbotham et al. | 175/52 |
| 6,361,250 B1 | 3/2002 | de Varax | |
| 6,854,520 B1 * | 2/2005 | Robichaux | 166/380 |
| 7,189,028 B1 * | 3/2007 | Signaroldi et al. | 405/166 |
| 2003/0044235 A1 | 3/2003 | Stockstill | |
| 2003/0231931 A1 | 12/2003 | Moszkowski et al. | |
| 2007/0189857 A1 | 8/2007 | Vergouw et al. | |
| 2011/0103894 A1 * | 5/2011 | Feijen et al. | 405/166 |

FOREIGN PATENT DOCUMENTS

| | | |
|---|---|---|
| EP | 1 265 017 | 12/2002 |
| WO | 2006085739 | 8/2006 |
| WO | WO 2009148297 A1 * | 12/2009 |

* cited by examiner

VERTICAL OFFSHORE FLEXIBLE PIPELINE ASSEMBLY

FIELD OF THE INVENTION

The invention relates to a device for an installation vessel with a deck to deploy a hydrocarbon transfer pipe composed of several pipe segments, the device comprising a trolley hoist lifting means, installed in a tower to lift a pipe segment from an horizontal position into a vertical position, an assembly platform, where a segment is connected to a previously launched transfer pipe string, the assembly platform being provided with a clamping device that is supported on the installation vessel and adapted to support the weight of the previously launched pipe string during assembling.

The present invention also relates to an offshore flexible hose installation method going from a vertical position to a horizontal position when deployed in the sea.

BACKGROUND OF THE INVENTION

Installation methods and devices for laying pipes from a vertical position to a horizontal position are already known, and described in various publications. In the international patent application WO2006085739 there is provided a method for installing an offshore pipeline where the weight of an accessory and a launched pipeline connected to the accessory is transferred from a clamping device to a controlled load hoisting device while the accessory and launched pipeline remain in a firing line. After disengaging the clamping device from the pipeline, the clamping device is moved out of the firing line. The accessory and launched pipeline are lowered along the firing line by the controlled load hoisting device.

In U.S. Pat. No. 6,361,250, there is provided a system and method to lay sub-sea pipelines at great depth. There is provided a tower which is particularly suitable for laying rigid pipes at depths up to 3000 m, with maximum loading of 600 tons. Rigid pipes are laid without plastic deformation, flexible pipes can also be handled. The carriages used are individually motorized, and operate on e.g. a rack and pinion, permitting the pipes to be moved and held in position. Conveniently, welding takes place at deck level. Demountable tower sections allow one tower to be used on another ship when necessary.

Further, in patent application US2007/0189857, there is disclosed a pipe laying tower with an upper clamping element vertically displaceable along a frame, and a lower clamping element supported on a vessel support structure. As the lower clamping element is not part of the J-lay frame, but is supported on the vessel support structure, the weight of the tower itself is reduced. This allows easy mounting of the lightweight frame portions and reduces modifications and structural reinforcements. Integration of the lower clamping block on the vessel support structure provides a low vertical center of gravity, reducing the motion-induced support loads on the vessel and providing for increased stability.

Such systems, however, require very good metocean conditions; the handling is time consuming and hence they provide expensive solutions. According to the present invention, there is provided a device and an offshore installation method to install a flexible hose offshore, which offer a large operation window as the operation can keep on going under high sea states such as for instance a sea state of 3 meters significant wave height.

The system according to the invention presents solutions that also increase the safety during installation, ease the access to personnel, and facilitate the key operations during installation.

SUMMARY OF THE INVENTION

The system, according to the present invention, enables the assembly and deployment of interconnected hose segments by using an offshore installation vessel. The interconnected hose segments form a flexible hose which can be used for offshore hydrocarbon (crude oil, liquefied gas, etc.) transfer between two offshore units. The system can accommodate several hose sizes and can accommodate specifically flexible hose segments with truncated hose ends.

The offshore flexible hose installation method is transfers hose segments from a vertical position at the upper deck of the installation vessel to a horizontal floating position when deployed in the sea to form an hose string. The deployment of the hose is carried out using the J-lay installation method going from a vertical to a horizontal position, the hose string floating at the sea surface.

It is therefore an object of the present invention to provide a device for an installation vessel with a deck to deploy a hydrocarbon transfer pipe which is a flexible hose string composed of several flexible hose segments that are assembled one to the other on an assembly platform. According to the invention the flexible hose string is guided from a vertical position into an inclined or a horizontal position via a hose string guide element which is placed under the assembly platform. A particularity of the hose string guide element is that it takes the out of plane bending loads of the tension in the hose string due to wave, wind and current and that it limits the bending radius of the hose string when going from a vertical position to a horizontal position.

A further aspect of the present invention provides a trolley hosting means which include a first and a second hosting means, so that an upended hose segment can be positioned and assembled with the first hoisting means, while reloading a new hose segment to be assembled with a second hosting means.

The present invention also provides an offshore flexible hose installation method comprising the steps of:

providing an installation vessel with a tower, equipped with hoist lifting means with at least one trolley, a hose string clamping mechanism and a hose string guide means, positioning and up-ending a hose segment so that it is in a vertical position, lowering the up-ended hose segment end and connecting it to the hose string that is clamped in the clamping mechanism, open the clamp and lower the connected hose segment through the clamps into the hose string guide mechanism, while guiding at the same moment the part of the hose string end that is near the installation vessel from a vertical position into an inclined or horizontal position via the hose string guide mechanism.

In accordance with a further aspect of the present invention, an offshore flexible hose installation method comprises the steps of:

providing an installation vessel with a tower, equipped with hoist lifting means with at least two trolleys, a hose string clamping mechanism and a hose string guide means, positioning and up-ending a hose segment with one trolley so that it is in a vertical position, horizontally displacing the trolley from its predetermined position to another predetermined position and the other trolley from its predetermined position to another predetermined position, getting the hose segment in line with the clamped hose segment connected to a hose string, assembling the hose segment to the clamped hose segment and, simultaneously positioning and up-ending a new hose segment.

Further, the device enables displacing the dual trolley hoist lifting means from one position to another so that the installation of a subsequent hose segment can start as soon as the previous hose segment is up ended and installed in line with the clamped hose string.

Another advantage of a device according to the present invention is that the whole device is a removable device that can be mounted on different installation vessels.

BRIEF DESCRIPTION OF THE DRAWINGS

The invention will be further described below in connection with exemplary embodiments with reference to the accompanying drawings, wherein:

FIG. 1 shows a side view of a general embodiment of the device laying a flexible line 2 composed of several hose segments 3 from an installation vessel 4 according to the present invention.

Figure 1:
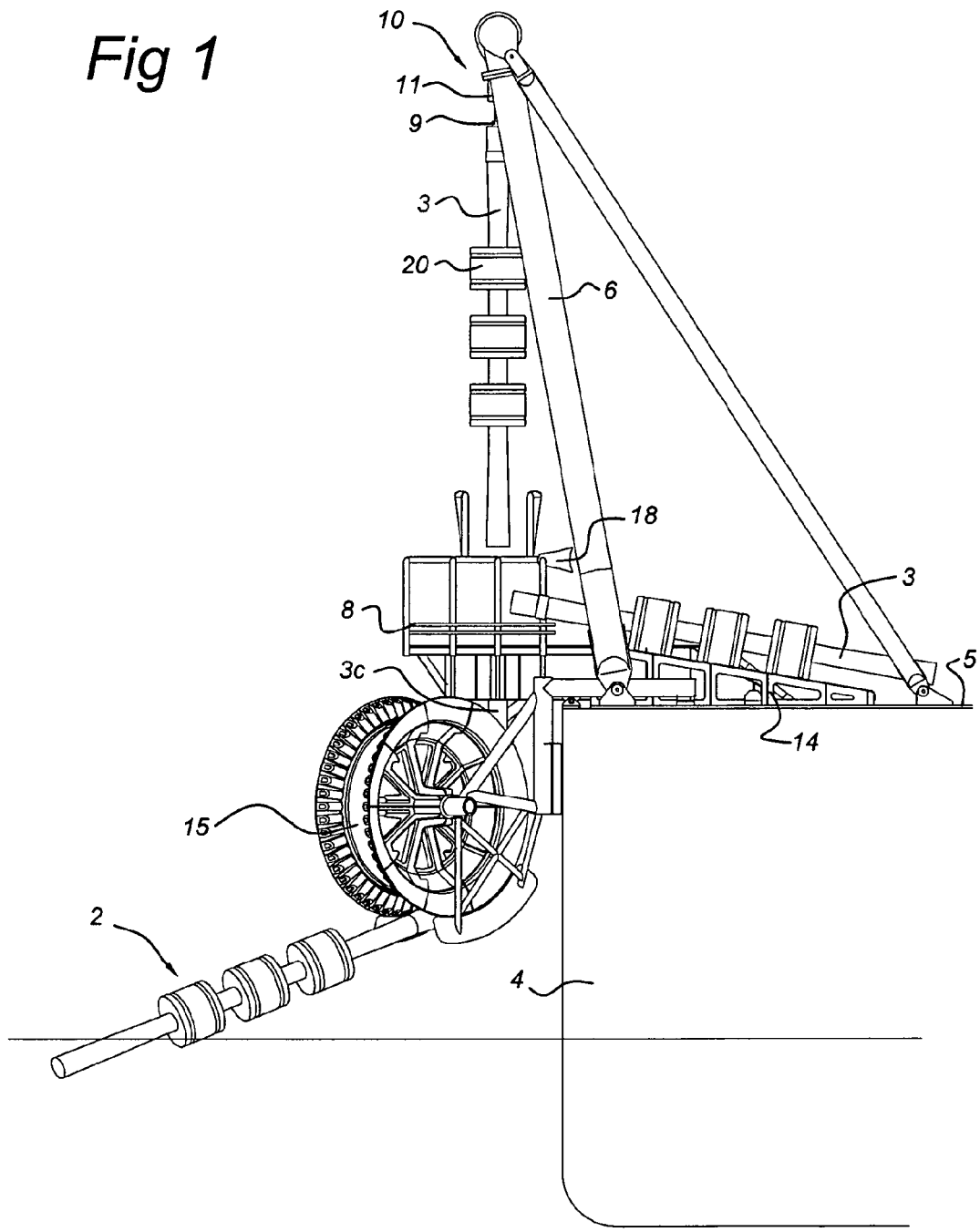
FIG. 1 shows a side view of a general embodiment of the device for laying a flexible line composed of several hose segments from an installation vessel according to the present invention.

On the deck 5 of the installation vessel 4 there is a tower 6 provided with a dual trolley hoist lifting means 10 that enables to up-end the hose segments 3. The hoist lifting means 10 lifts the hose segment 3 to the bolting location and aligns the hose segments 3 along all axes with the clamped hose 3c in the assembly platform 8. Close alignment with the clamped hose 3c is very important due to the tight tolerances of the bolt holes between the two hose segments 3 and 3c. Before the hose segment 3 is up-ended by the hoist lifting means 10, a lifting hub 9 is provided at the hose segment extremity and is connected to the lifting means 10. The hub 9 and hose segment 3 are preinstalled in a gutter 14. While the hose segment 3 is up loaded by the hoisting means 10, it is contained and guided by the guiding system or gutter 14. Once the top extremity of segment 3 reaches a certain height, it is then contained in a locking hatch 18 to avoid the hose segment from swaying. Thereby, the top extremity of the hose segment and the lower hose end are both restricted from moving in all directions in every steps of the installation. Hence, the guiding means 14, 18 prevents the hose segment 3 from moving or dangling in unwanted directions due to vessel motions and is further useful to position the bottom of the up-ended hose segment 3 exactly in line with the clamped hose segment 3c at the assembly platform 8.

The combined operation of the tower 6, the dual trolley hoist lifting means 10 and the guiding means 14, 18 constrains the hose top- and bottom ends along all axes during up-ending and bolting, which renders the operation much safer.

Figure 2:
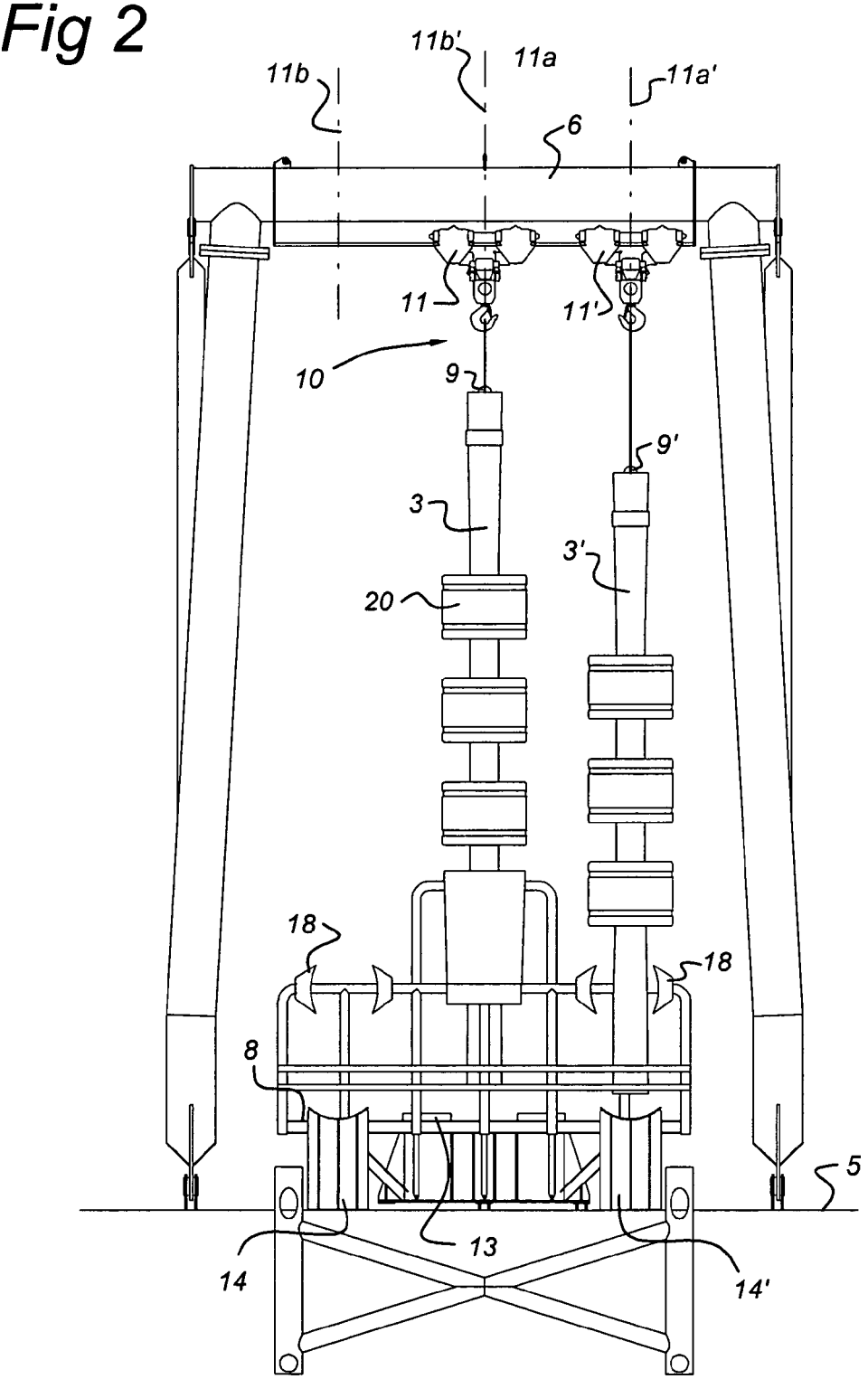
FIGS. 2 to 4 show the different main steps of the offshore flexible hose installation method, the hose passing from a vertical position to a horizontal position when deployed in the sea according to the present invention.
Figure 3:
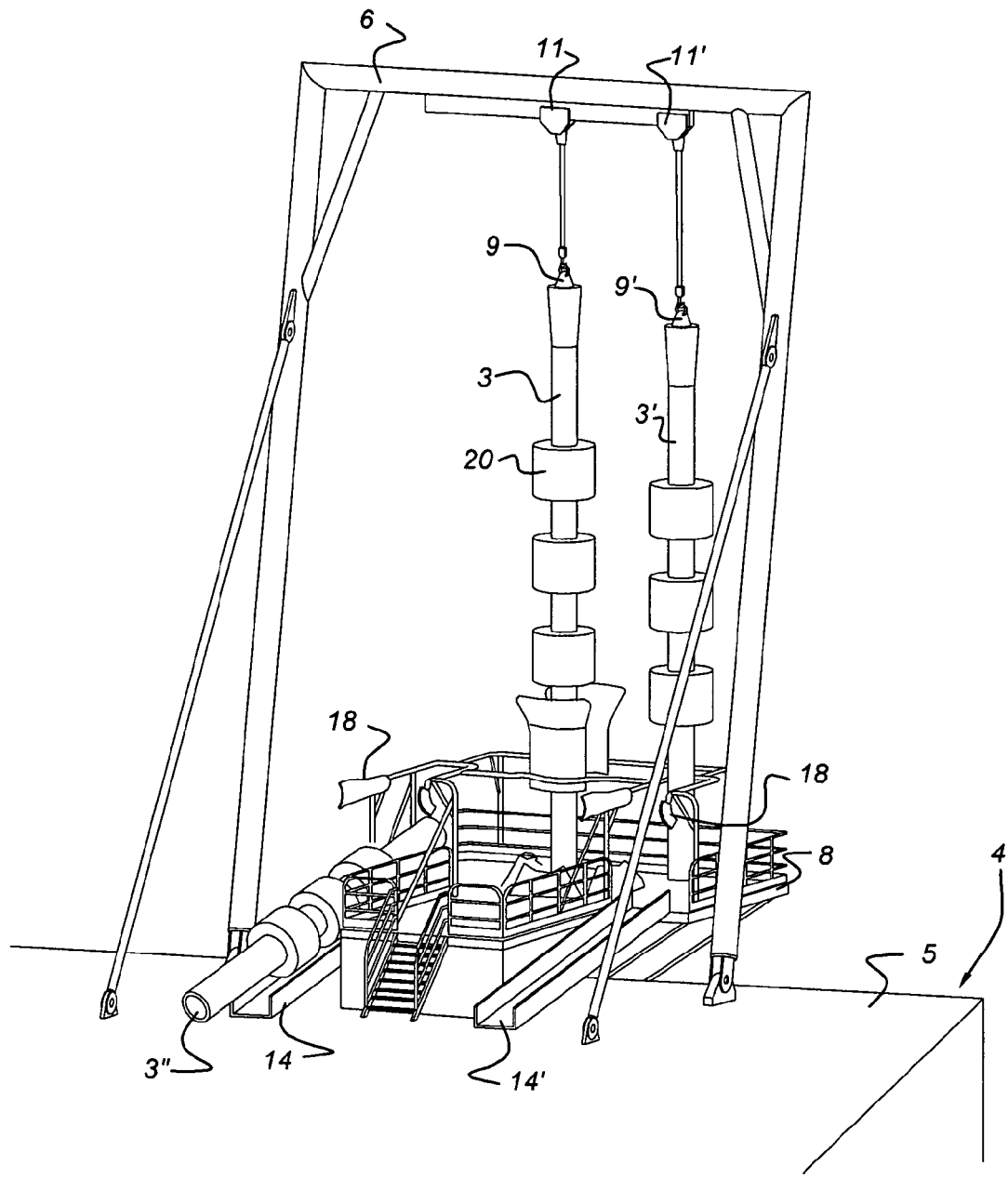
Figure 4:
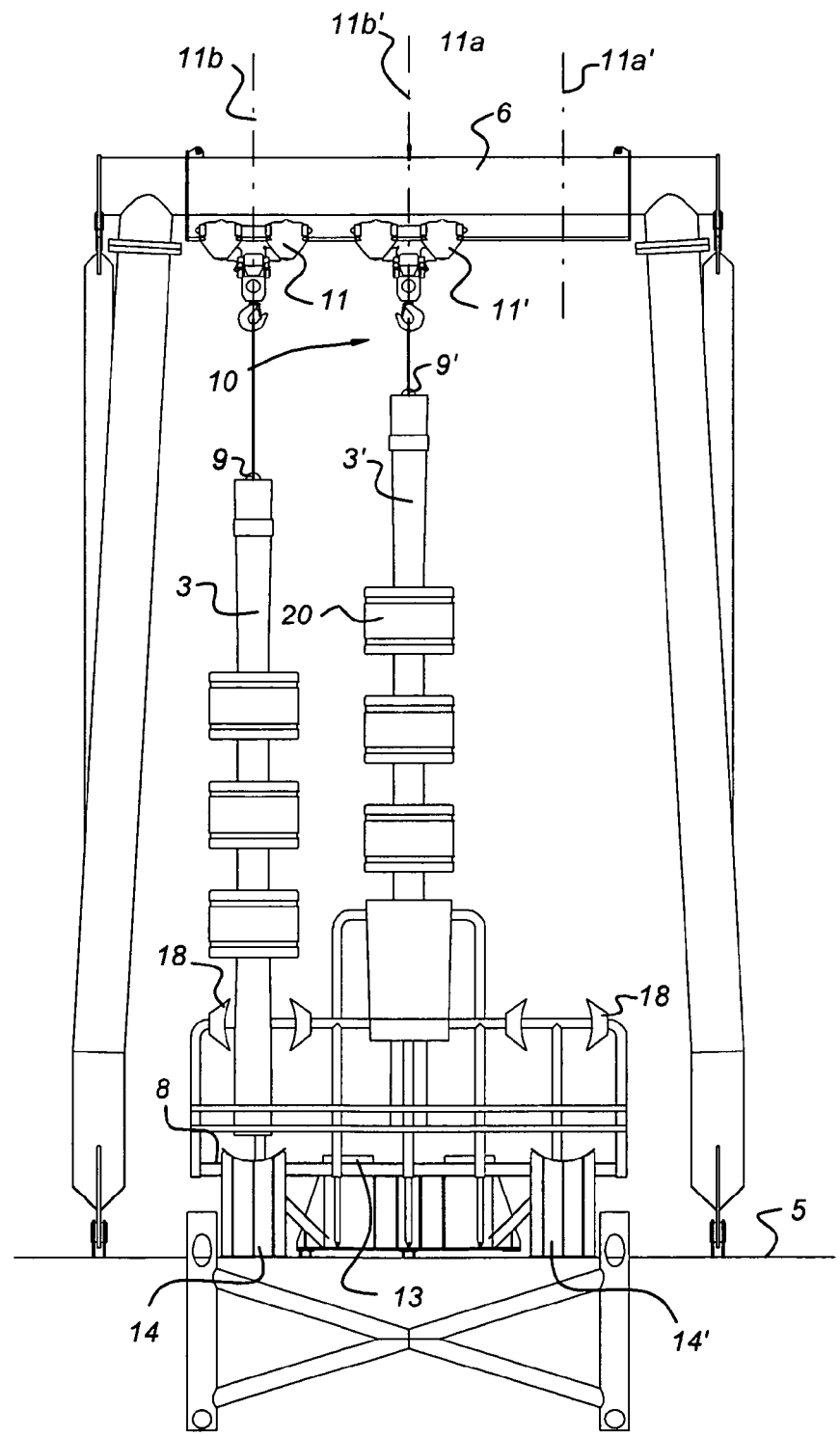

FIGS. 2 to 4 show the different main steps of the offshore flexible hose installation method going from a vertical position to a horizontal floating position when deployed in the sea.

The dual trolley hoist lifting means 10 are provided with two trolleys 11, 11' which are displaceable in a horizontal direction, each from one predetermined position 11a, 11a' to another predetermined position 11b, 11b' in order to save time during the operation. In fact, displacing the dual trolley hoist lifting means from a position to another, enables the installation to benefit from the reloading function. Hence, the installation method for a new hose segment 3' can start as soon as the previous hose segment 3 is up ended and installed in line with the clamped hose segment 3c. The displaceable dual trolley hoist lifting means shortens the assembly time per hose segment and can make a large difference in the total operation time.

In FIG. 3, the deck crane (not shown) has preinstalled a hose segment 3" in a gutter 14. This hose segment will be up ended by the trolley 11, once the trolley 11 will be displaced from location 11a to location 11b. While the trolley 11 will be displaced, so will the trolley 11' from location 11a' to location 11b' bringing the already up loaded hose segment 3' into position above the clamping device 13 in alignment with the clamped hose segment 3c (not shown) for assembly. In FIGS. 2 to 4 it appears clearly that the dual trolley hoist lifting means 10 is composed of two trolleys 11 and 11' each connected to a hose segment 3, 3' via a lifting hub 9, 9'. Buoyancy modules 20 are preinstalled on the hose segments.

Figure 5A:
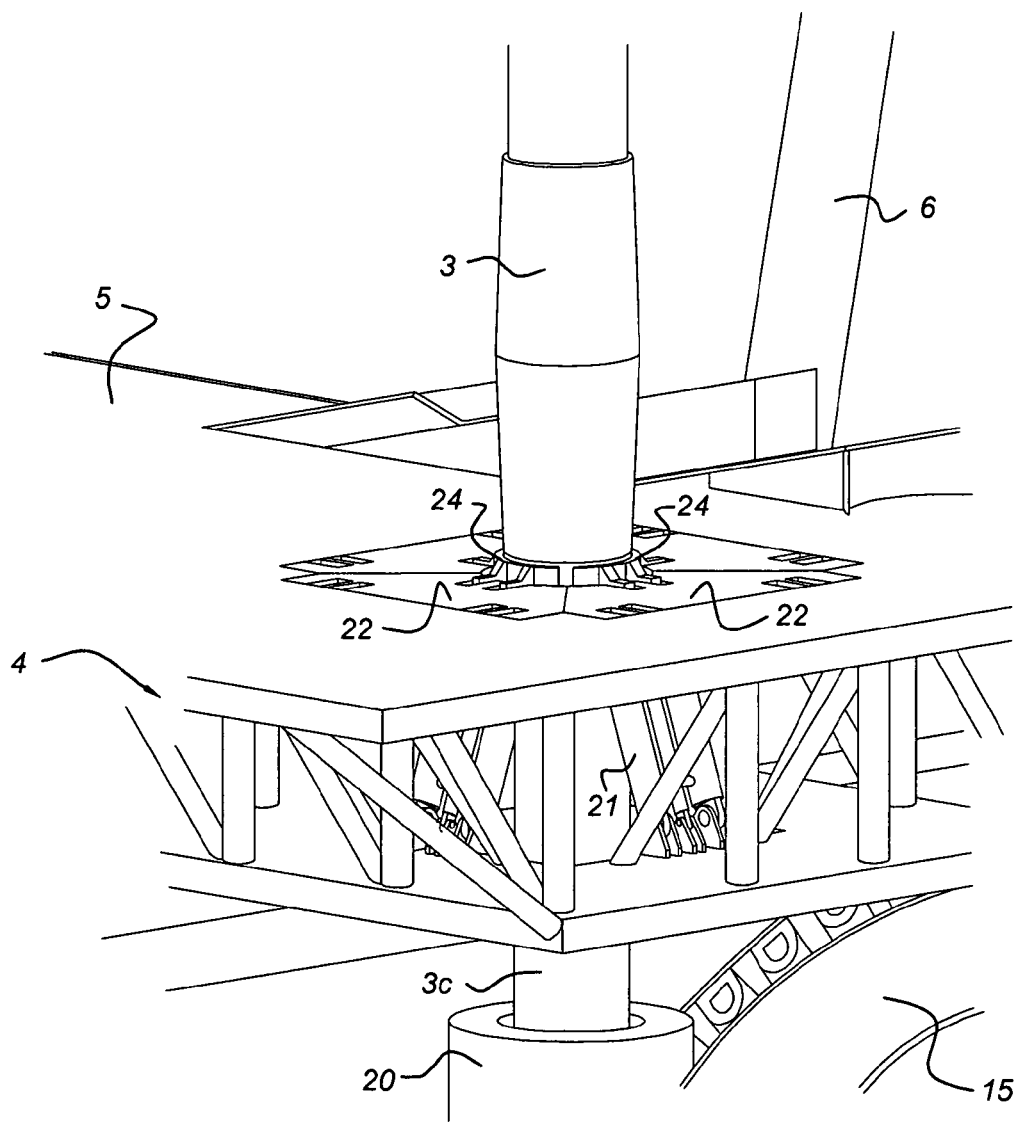
FIGS. 5a and 5b show detailed views of the clamping and holding means of the assembling platform of the present invention.
Figure 5B:
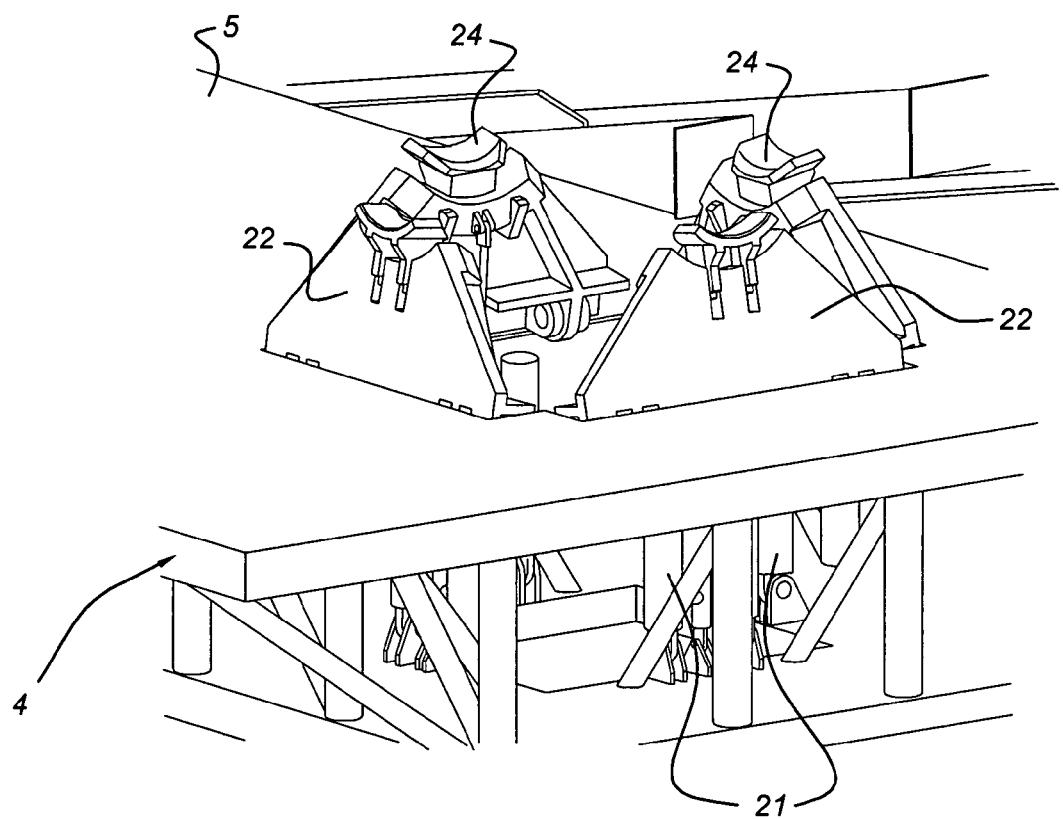

As shown in FIGS. 5a and 5b, there is a clamping system 13 fitted in or on the assembly platform 8. The clamping system is required to hold the assembled hose string, or line 2 so that it is safe to bolt a new hose segment 3 to the hose string assembly 2.

During normal operating conditions, the hose string 2 first rests on the top of the clamping system 13 and then provides a certain pressure in order to overcome the up-lift of the hose string 2 due to relative motion between the installation vessel 4 and the hose string. In an emergency case i.e. where the hose string has been punctured, broken or cracked during the assembly operation, the clamp is to hold the fully assembled hose string, about 2 km long, fully flooded with seawater. The clamp can also open wide enough to allow buoyancy modules 20 to pass through the clamp. The buoyancy modules are pre-installed on the hose segments 3 before bolting to the hose string 2. The clamping and holding means of the assembly platform are composed of four plates 22 that can open or close by rotation. The plates 22 are equipped with translating clamps 24 that squeeze the hose segment under the action of hydraulic cylinders 21 as shown in FIG. 5b. The clamps 24 can be changed out to accommodate different hose sizes.

The assembly platform 8 also allows about 5-6 men to walk around the bolting area of the two hose segments 3 and 3c, the platform 8 providing easy access during operation and/or maintenance.

Figure 6:
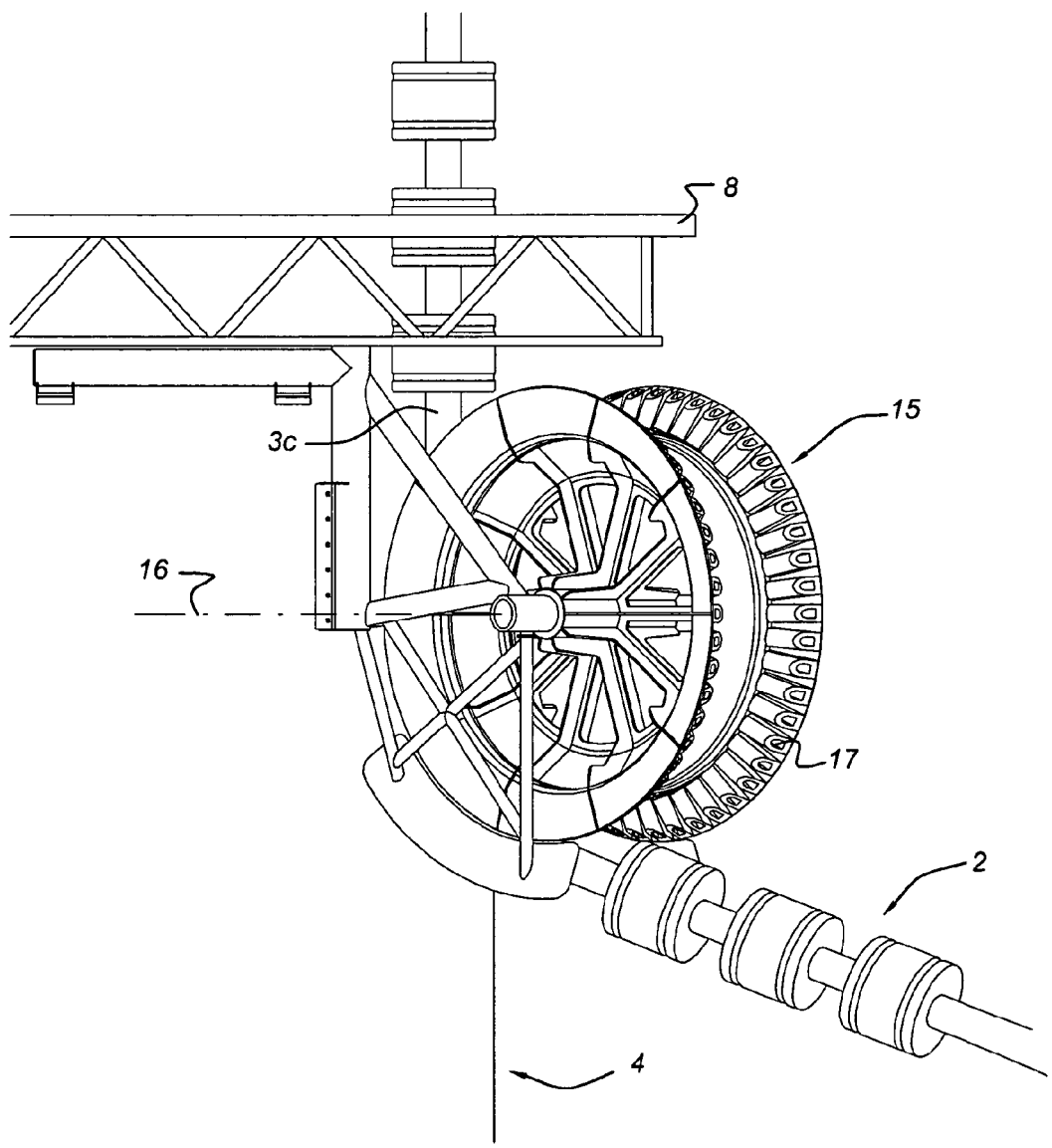
FIG. 6 shows a detailed view of the hose string guide element in the last step of the installation method according to the present invention

When being clamped, a hose segment must not be bent. This is ensured by the hose string guide element 15 shown in FIG. 6.

The hose string guide element 15 takes up all out of plane loads, by creating only a vertical pulling force on the clamping system 13. The hose string guide element 15 is creating a gradually curved transition of the hose string 2 from the vertical to a horizontal position. It also restricts the hose 2 from bending further than its minimum allowable bending radius. Because the sheave is rotating around a shaft 16, there will be no shaving between the hose 2 and hose string guide element 15. The system is also fitted with D-fenders 17 bolted all around the circumference of the hose string guide element 15. The function of the D-fenders is to protect the buoyancy modules from being crushed by the forces induced by the current pushing on the already assembled hose string 2. The D-fenders 17 can absorb excessive loads on the buoyancy module while inside the sheave.

The hose string guide element 15 is positioned at an angle regarding the vessel's hull. The angle chosen is the most favorable angle in relation to the wave and current directions. The hose string guide element 15 can have multiple fixed deployment angles (passive) or could be provided with bearings allowing the hose string guide element to rotate during operation (active). The hose string guide element will be supported on the deck 5 and on the hull of the installation vessel 4.

The combination of up-ending and constraining the both ends of the hose segments allows the operation to continue until high sea states, such as for instance a sea state of 3 meters significant wave height. This results in a large operation window and smaller chances of downtime.

One embodiment of a device according to the invention is characterized in that the clamping device can grip and support the weight of a fully assembled hose string fully flooded with seawater in emergency cases.

In another device according to the invention, the clamping and the flexible hose holding device form an integral unit.

Furthermore the device can be a removable device.

Again another embodiment of an offshore deployment device comprises deck, an assembly platform for clamping a pipe segment in a vertical orientation in a clamping member, two substantially parallel up righting guide elements pivotable between a substantially horizontal support position and a vertical transfer position for each supporting a pipe segment, and a lifting device having a transverse track and comprising two trolleys displaceable along said track, each trolley attachable to respective upper end of a pipe section that is supported on an up righting guide element, wherein each pipe segment in a substantially vertical position can be moved via the respective trolley along the transverse track, from a vertical transfer position at a distance from the clamping member to an assembly position at or near the clamping member.

Although particular embodiments of the invention have been described and illustrated herein, it is recognized that modifications and variations may readily occur to those skilled in the art, and consequently, it is intended that the claims be interpreted to cover such modifications and equivalents.

The invention claimed is:

1. An offshore deployment device for an installation vessel (4) with a deck (5) to deploy a hydrocarbon transfer pipe string (2) composed of several pipe segments (3), the device comprising:
 a trolley hoist lifting means (10), installed in a tower (6) to lift a pipe segment (3) from an horizontal position into a vertical position,
 an assembly platform (8), where the pipe segment (3) is connected to a previously launched hydrocarbon transfer pipe string (2), the assembly platform (8) being provided with a clamping device (13) that is supported on the installation vessel (4) and adapted to support the weight of the previously launched pipe string (2) during assembling, wherein the hydrocarbon transfer pipe string is a flexible hose string (2) composed of several connected flexible hose segments (3), and
 a hose string guide element (15) placed under the assembly platform and comprising a guiding sheave rotatable around a horizontal axis, the guiding sheave transitions the flexible hose string from a vertical position into an inclined or a horizontal position, wherein the guiding sheave is of a diameter large enough to restrict the flexible hose from bending further than a minimum allowable bending radius of the flexible hose string and the guiding sheave contacting the flexible hose string along a part of the guiding sheave's circumference to thereby cause a gradually curved transition of the pipe string from the vertical to the inclined or horizontal position.

2. The offshore deployment device of claim 1, wherein the guide element (15) is placed at least partly above water level.

3. The offshore deployment device of claim 1, wherein the clamping device (13) is provided with clamps (22, 24) which can accommodate variable diameter hose segments.

4. The offshore deployment device of claim 1, wherein the hose string guide element (15) is provided with elements (17) that absorbs the out of plane bending loads in the hose string resulting from wave, wind and currents loads that are acting on the hose string.

5. The offshore deployment device of claim 1, wherein the hose string guide element (15) is adjustable around a vertical axis so that the firing line of the hose string can be adjusted or varied with regard to the length axis of the installation vessel.

6. The offshore deployment device of claim 1, wherein the trolley hoist lifting means (10) comprises a dual trolley hoisting means which include a first and a second hoisting means, so that an upended hose segment (3') can be positioned and assembled with the first hoisting means, while reloading a new hose segment (3") to be assembled with the second hoisting means.

7. The offshore deployment device of claim 6, wherein two trolleys (11, 11') are installed on the dual trolley hoist lifting means (10), the trolleys (11,11') being displaceable in a horizontal direction, each from one predetermined position (11*a*, 11*a'*) to another predetermined position (11*b*, 11*b'*).

8. The offshore deployment device of claim 1, wherein the hose segments are provided with a lifting hub (9, 9') to connect the hose segments to the hoisting means (10).

9. The offshore deployment device of claim 1, wherein the hose segments are preinstalled in a guiding system (14, 14').

10. The offshore deployment device to claim 1, wherein the hose segments are upended using two guiding systems (14, 18).

11. The offshore deployment device of claim 3, wherein the hose string guide element (15) is provided with elements (17) that absorbs the out of plane bending loads in the hose string resulting from wave, wind and currents loads that are acting on the hose string.

12. The offshore deployment device of claim 3, wherein the clamps can open wide enough to allow buoyancy modules (20) attached to the hose segment (3) to pass through.

13. An offshore installation method for a flexible hose string comprising multiple hose segments, comprising the steps of:
 providing an installation vessel (4) with a tower (6), equipped with hoist lifting means (10) with at least one trolley (11, 11'), a hose string clamping mechanism, and a hose string guide sheave (15),
 clamping a hose string in the clamping mechanism, the clamped hose string including a hose string part in a vertical position above the string guide sheave (15), with the trolley, positioning and up-ending a hose segment (3) so that the hose segment (3) is in a vertical position, with the hoist lifting means (10), lowering the up-ended hose segment and connecting a lower end of the up-ended hose segment to an upper end of the hose string that is clamped in the clamping mechanism thereby make the up-ended hose segment a connected hose segment of the flexible hose string, opening the clamping mechanism and, with the hoist lifting means (10), lowering the upper end of the hose string and the connected hose segment, via the clamping mechanism, into the hose string guide mechanism, while guiding, at the same moment, the hose string part that is in the vertical position above the string guide sheave (15) from the vertical position into a horizontal position via the hose string guide sheave (15) the upper end of the hose string and an adjacent portion of the flexible hose string contacting a part of a circumference of the string guide sheave to gradually make a curved transition of the hose string part and the adjacent portion of the flexible hose string from the vertical position to the horizontal position, the string guide sheave having a diameter large enough to restrict the flexible hose from bending further than a minimum allowable bending radius of the flexible hose string.

14. An offshore installation method for a flexible hose string comprising multiple hose segments, comprising the steps of:

providing an installation vessel (4) with a tower (6), equipped with hoist lifting means (10) with at least two trolleys (11, 11'), a hose string clamping mechanism (13) and a hose string guide sheave (15), the string guide sheave having a diameter, positioning and up-ending a hose segment (3) with one trolley (11) so that it is in a vertical position, horizontally displacing the trolley (11) from a first predetermined position (11a) to another second predetermined position (11b) and the other trolley (11') from a third predetermined position (11a') to another fourth predetermined position (11b'), getting the hose segment (3) in line with the clamped hose segment (3c) connected to hose string (2) using the second trolley (11'), assembling the hose segment (3) and the clamped hose segment (3c) to define a new assembled portion of the flexible hose string in a vertical position above the string guide sheave (15), simultaneously positioning and up-ending a new hose segment (3'), and unclamping the new assembled portion of the flexible hose string and lowering the new assembled portion of the flexible hose string, while at the same moment guiding the new assembled portion of the flexible hose string in the vertical position above the string guide sheave (15) into an inclined or a horizontal position via the hose string guide sheave means (15) by the new assembled portion of the flexible hose string contacting a part of a circumference of the string guide sheave to gradually make a curved transition from the vertical position to the inclined or horizontal positions, the diameter of the string guide sheave being large enough to restrict the flexible hose from bending further than a minimum allowable bending radius of the flexible hose string.

15. The offshore method of claim 14, wherein displacing the dual trolley hoist lifting means (10) from the first position to the second position enables starting the installation method for a hose segment (3') as soon as the previous hose segment (3) is up-ended and positioned in line with the clamped hose segment (3c) connected to hose string (2).

16. The offshore method of claim 13 wherein during the clamping step, the hose string is held in the clamping mechanism by a clamping device (13).

17. The offshore method of claim 14 wherein a locking hatch is used to clamp the up-ended hose segment (3) to avoid the up-ended hose segment from swaying.

18. The offshore method of claim 13 wherein a locking hatch is used to clamp the up-ended hose segment (3) to avoid the up-ended hose segment from swaying.

\* \* \* \* \*